United States Patent
Bohlke et al.

(10) Patent No.: US 9,452,698 B2
(45) Date of Patent: Sep. 27, 2016

(54) CENTRE BACKREST ASSEMBLY FOR A VEHICLE INTERIOR

(71) Applicants: Hartmut Bohlke, Wuppertal (DE);
Juergen Salewski, Duesseldorf (DE);
Wolfgang Sitzler, Wuppertal (DE);
Andreas Goebbels, Kuerten (DE);
Bogdan Tutelea, Leichlingen (DE);
Wolfram Zummack, Troisdorf (DE)

(72) Inventors: Hartmut Bohlke, Wuppertal (DE);
Juergen Salewski, Duesseldorf (DE);
Wolfgang Sitzler, Wuppertal (DE);
Andreas Goebbels, Kuerten (DE);
Bogdan Tutelea, Leichlingen (DE);
Wolfram Zummack, Troisdorf (DE)

(73) Assignee: BOS GMBH & CO. KG, Ostfildern (DE)

(*) Notice: Subject to any disclaimer, the term of this patent is extended or adjusted under 35 U.S.C. 154(b) by 0 days.

(21) Appl. No.: 14/751,584

(22) Filed: Jun. 26, 2015

(65) Prior Publication Data

US 2016/0001683 A1   Jan. 7, 2016

(30) Foreign Application Priority Data

Jul. 3, 2014   (DE) .................. 10 2014 212 883

(51) Int. Cl.
*B60N 2/46*   (2006.01)
*B60N 2/20*   (2006.01)
*B60N 2/48*   (2006.01)

(52) U.S. Cl.
CPC ............. *B60N 2/4613* (2013.01); *B60N 2/206* (2013.01); *B60N 2/4686* (2013.01); *B60N 2/4693* (2013.01); *B60N 2/4873* (2013.01)

(58) Field of Classification Search
CPC .. B60N 2/4613; B60N 2/206; B60N 2/4873; B60N 2/4686; B60N 2/4693
USPC ............................................ 297/188.07, 117
See application file for complete search history.

(56) References Cited

U.S. PATENT DOCUMENTS

| 5,384,946 A * | 1/1995 | Sundstedt | B60N 2/3084 297/117 X |
| 8,496,290 B2 * | 7/2013 | Maier | B60N 2/206 297/112 |
| 2005/0225130 A1 * | 10/2005 | Kobayashi | B60N 2/206 297/188.07 X |

FOREIGN PATENT DOCUMENTS

| DE | 19947871 C1 * | 3/2001 | .......... B60N 2/4613 |
| DE | 102011103614 A1 * | 2/2012 | .......... B60N 2/4613 |
| DE | 10 2011 112 440 A1 | 4/2012 | |
| JP | 2006-123583 A | 5/2006 | |

* cited by examiner

*Primary Examiner* — Anthony D Barfield
(74) *Attorney, Agent, or Firm* — Flynn, Thiel, Boutell & Tanis, P.C.

(57) ABSTRACT

A center backrest assembly having a main body which is mounted in the vehicle interior so as to be pivotable between an upright backrest position and a lowered functional position. The main body includes a head region which in the backrest position is positioned at the top. The head region on at least one lateral face has a lateral part which is mounted on the main body so as to be movable between a bearing position which bears on the head region and a laterally deployed deployment position.

17 Claims, 3 Drawing Sheets

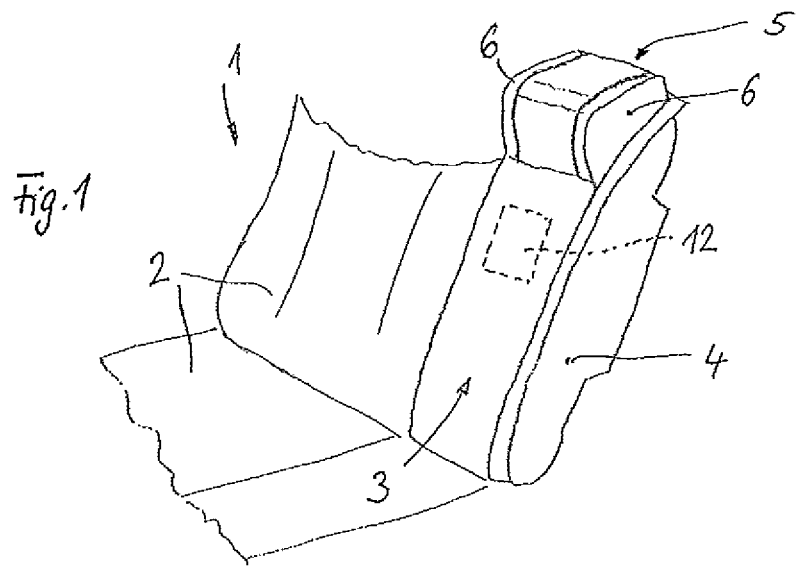
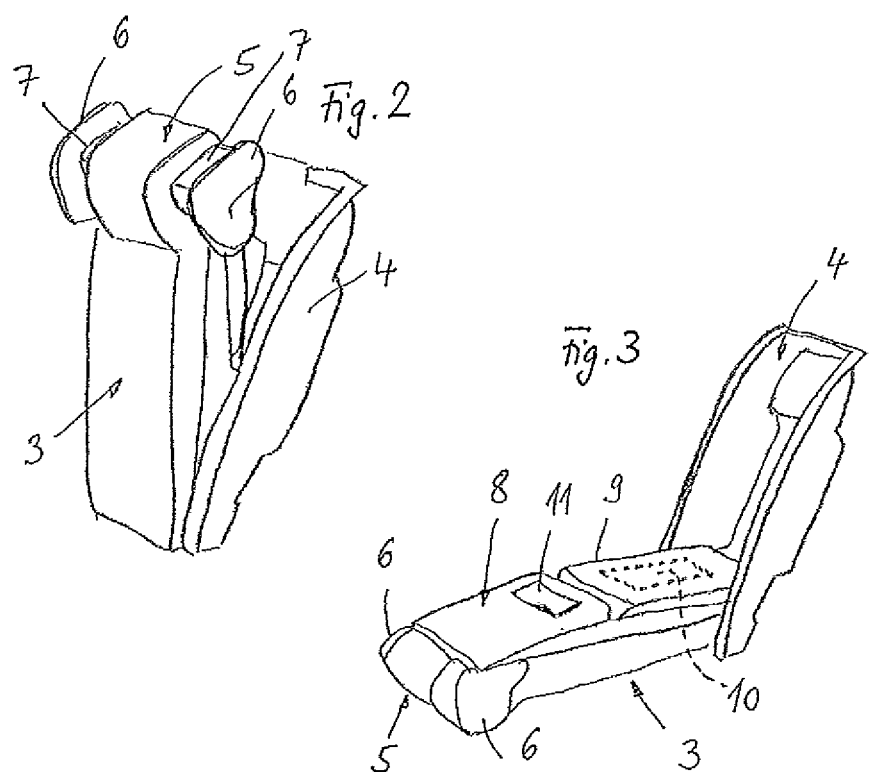

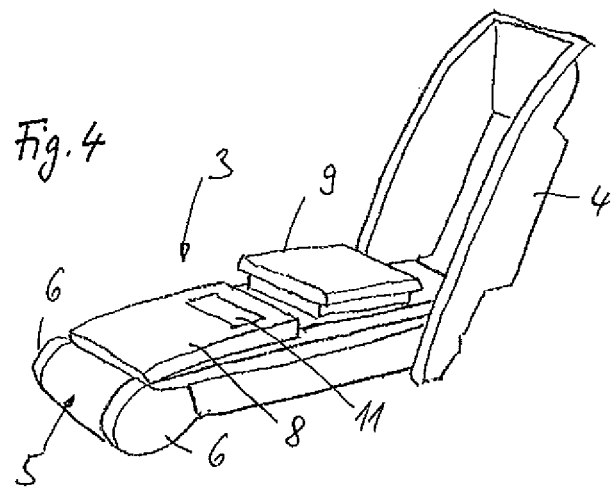
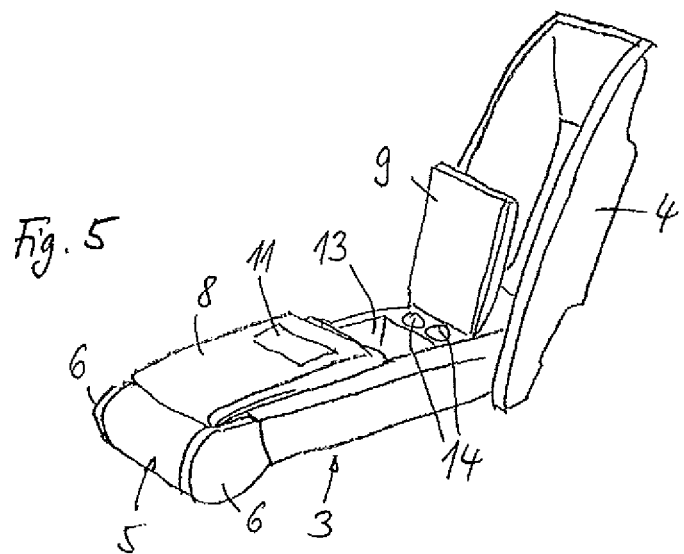
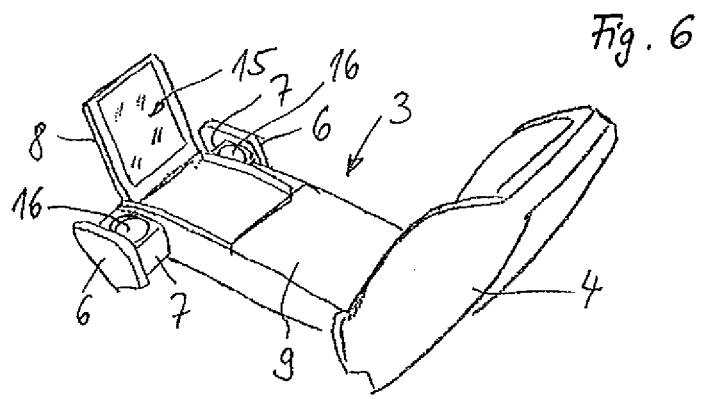

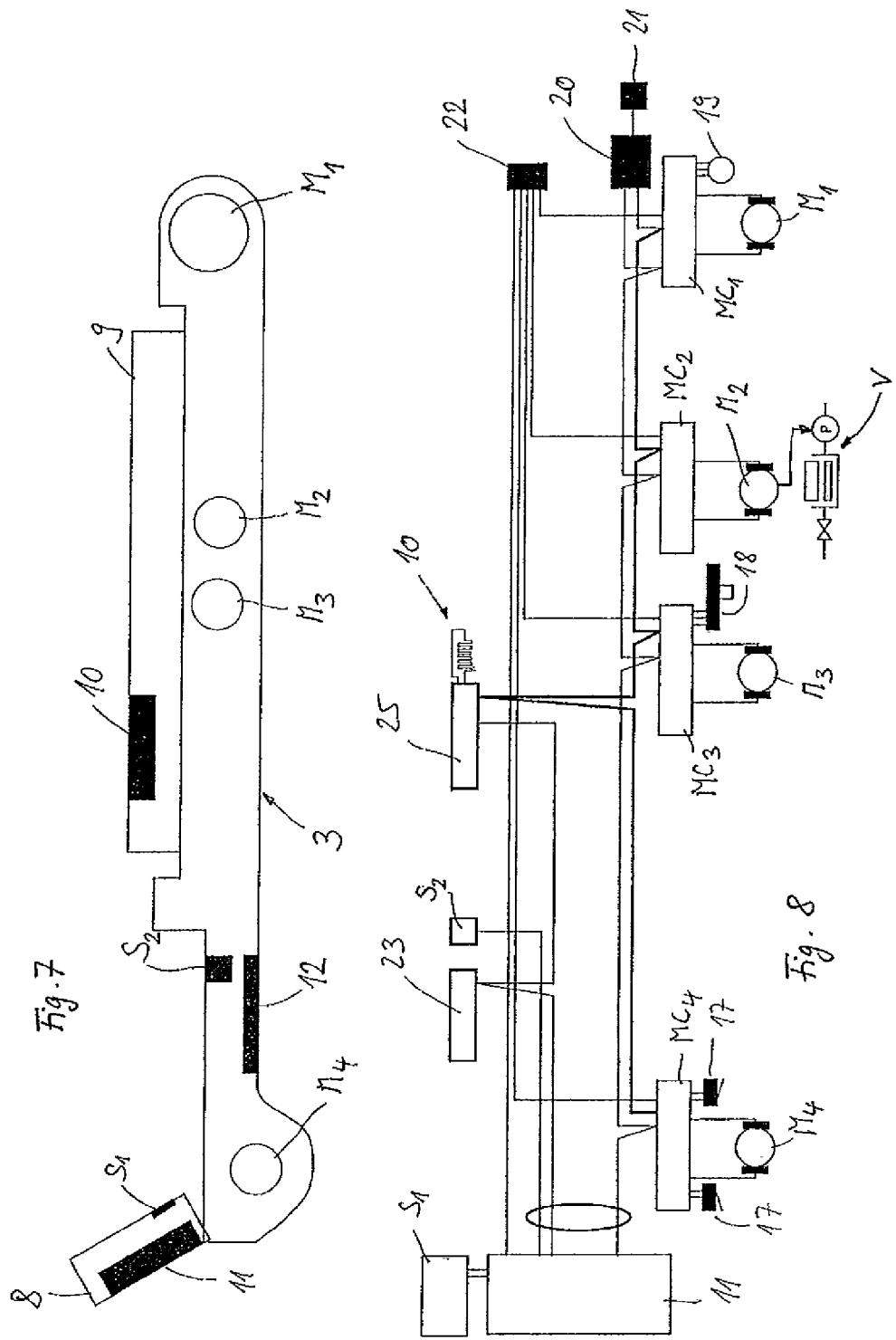

CENTRE BACKREST ASSEMBLY FOR A VEHICLE INTERIOR

CROSS-REFERENCE TO RELATED APPLICATIONS

This claims the priority of German patent application DE 10 2014 212 883.8, filed on Jul. 3, 2014, the disclosure of which is hereby incorporated by reference into this application.

FIELD OF THE INVENTION

The invention relates to a centre backrest assembly for a vehicle interior, having a main body which is mounted in the vehicle interior so as to be pivotable between an upright backrest position and a lowered functional position, wherein the main body, for supporting a head or a neck of a vehicle occupant, comprises a head region which in the backrest position is positioned at the top.

BACKGROUND OF THE INVENTION

A centre backrest assembly of this type for a rear seat-bench of a passenger motor vehicle is known in general. The centre backrest assembly comprises a main body which is pivotably mounted on the vehicle side and which—with respect to an upright backrest position—in the region of its front side is provided with upholstery. Moreover, the main body has a head region which in the backrest position serves as a support for a head or a neck of a vehicle occupant sitting in the region of the centre backrest assembly. In order to obtain an armrest for persons who are laterally located on the rear seatbench, the main body may be folded down towards the front. In this functional position which is lowered towards the front, container receptacles or a storage space are/is accessible on the main body.

SUMMARY OF THE INVENTION

It is an object of the invention to provide a centre backrest or support assembly of the type mentioned at the outset which offers improved functional potential as compared with the prior art.

This object is achieved in that the head region on at least one lateral face has a lateral part which is mounted on the main body so as to be movable between a bearing position which bears on the head region and a laterally deployed deployment position. Preferably, lateral parts are provided on two opposite lateral faces of the head region. The lateral parts in the region of their surface may be upholstered and/or ergonomically designed, in order to enable the lateral bearing of a head for a sleeping position of a person sitting beside the centre backrest assembly. Moreover, the at least one lateral part in its laterally deployed deployment position in the case of a main body which is pivoted downward into the lowered functional position may be employed as a knee support for bearing a knee or a leg of a person sitting beside the centre backrest assembly within the vehicle interior.

In a design embodiment of the invention, two lateral parts which are disposed so as to be movable in opposite directions in relation to one another are provided on opposite lateral faces. The two lateral parts are disposed so as to be movable independently of one another and may be retracted or deployed as required. Alternatively, it is possible for the lateral parts to be mechanically or electrically interlinked and thus for both lateral parts to be synchronously retracted or deployed in a mutually opposing manner. On account of the provision of two lateral parts on both sides of the head region, two persons sitting on opposite sides beside the centre backrest assembly may laterally rest their head.

In a further design embodiment of the invention, each lateral part is guided in a linearly movable manner in the main body. The at least one lateral part according to the invention may be disposed so as to be movable in a pivotable or linear manner or along a curved path. Guiding of the lateral part in a linearly movable manner in the main body is particularly advantageous, since guiding of this type in a linearly movable manner can be constructed in a very simple manner. Displacement of the lateral part may be manually and mechanically performed. Alternatively, displacement may be performed by means of a drive unit.

In a further design embodiment of the invention, the main body is fixable in an upright sleeping position in which the main body in relation to its backrest position is displaced by a defined pivot angle in the direction of the functional position, and which is oriented in relation to adjacent backrest portions of the vehicle interior in such a manner that unhampered movement of the at least one lateral part into its laterally deployed deployment position is enabled. On account of the fixability of the main body in an upright sleeping position which preferably is advanced in relation to the upright backrest position, an ergonomically particularly favourable lateral bearing of a head for a person who is located on a laterally adjacent seat assembly is enabled. Moreover, it is ensured in this upright sleeping position that adjacent backrest or headrest portions of the lateral seat assemblies do not hamper a deploying movement of the respective lateral part. Fixing of the main body in the sleeping position is performed in particular either by way of blocking a pivot drive of the main body in this position, or by way of additional mechanical arresting elements which are electrically activated by a controller of the pivot drive.

In a further design embodiment of the invention, the lateral part is assigned a drive unit for displacing the lateral part between the bearing position and the deployment position. Preferably, the drive unit is implemented so as to be electric. Alternatively, it is also possible for a pneumatic or hydraulic drive unit or else a mechanical drive unit in the form of a spring accumulator to be provided. The mechanical drive unit in the form of a spring accumulator enables an automatic displacement movement in one direction. Manual repositioning is required in the opposite direction.

In a further design embodiment of the invention, a control device, which activates or deactivates the drive unit depending on a pivoting position of the main body, is provided. Preferably, the control device is implemented so as to be electric or electronic. Preferably, sensor technology which is complementary thereto and which identifies a sleeping position or a lowered functional position of the main body and activates or deactivates the drive unit depending on the position of the main body is provided.

In a further design embodiment of the invention, each lateral part has a guide body which is mounted on the main body and in the deployment position is disposed between the lateral part and the main body and which comprises a container receptacle. Preferably, the container receptacle is positioned and designed in an open manner such that an open side of the container receptacle in the lowered functional position of the main body points upward, so as to serve as a drink holder.

In a further design embodiment of the invention, a lateral face of the lateral part is provided with upholstery. On account thereof, a particularly comfortable head or knee support face results, depending on the position of the main body.

The invention also relates to a centre backrest assembly of the type mentioned at the outset, having an upper side which is accessible in the lowered functional position and a lower side which is accessible in the upright resting position. According to the invention it is provided in a centre backrest assembly of this type that the upper side and/or the lower side of the main body are/is assigned an upholstered cushion which in its contouring and/or its firmness is configured so as to be variable. The upholstered cushion may comprise one or a plurality of air-cushioned portions which are pneumatically impingeable and in this way, by correspondingly controlled compressed air, the upholstered cushion may be varied in terms of contouring and/or firmness.

In a further design embodiment of the invention, the main body comprises a height-adjustable armrest part. In the lowered functional position of the main body the armrest part is provided in the region of the upper side and enables resting one's arm at various heights, on account of which adapting to persons of various size is made possible in the region of a seat assembly which laterally flanks the centre backrest assembly.

In a further design embodiment of the invention, the main body is mounted, so as to be pivotably movable, in a frame structure which is fixed with respect to the vehicle. The frame structure forms a pivotable mounting for the main body. Preferably, the main body and the frame structure are installable in the vehicle interior as a pre-assembled functional unit and therein connectable to supporting structural parts of the vehicle body.

BRIEF DESCRIPTION OF THE DRAWINGS

Further advantages and features of the invention are derived from the claims and from the following description of preferred exemplary embodiments of the invention which are illustrated by means of the drawings, in which:

FIG. 1 shows, in a schematic illustration, an embodiment of a centre backrest assembly according to the invention in the region of a rear seatbench of a passenger motor vehicle;

FIG. 2 shows the centre backrest assembly according to FIG. 1 in a sleeping position which is pivoted forward and fixed;

FIG. 3 shows the centre backrest assembly in a lowered functional position of the main body thereof;

FIG. 4 shows a further illustration of the centre backrest assembly according to FIGS. 1 to 3, in a lowered functional position of the main body thereof and with one functional portion being activated;

FIG. 5 shows an illustration which is similar to FIG. 4, with a further functional portion being activated;

FIG. 6 shows the centre backrest assembly according to FIGS. 1 to 5, in another perspective illustration with an activated tablet computer;

FIG. 7 shows, in a schematic and enlarged side view, a functional illustration of the centre backrest assembly according to FIGS. 1 to 6; and FIG. 8 schematically shows a block diagram for controlling the various functional portions of the centre backrest assembly according to FIG. 7.

DETAILED DESCRIPTION

A rear seatbench 1 according to FIG. 1 is provided in a vehicle interior of a passenger motor vehicle. The rear seatbench 1 has two lateral seat assemblies 2, of which, when viewed in the travel direction, the right-hand seat assembly 2 is indicated in FIG. 1. A centre seat assembly which comprises a centre backrest or support assembly 3, 4 is provided between the two seat assemblies 2. The centre backrest assembly 3, 4 has a main body 3 which, in a lower end region, is mounted, so as to be pivotably movable about a pivot axis extending in a transverse direction with respect to the vehicle, in a frame structure 4 which is arranged fixedly with respect to the vehicle. Pivotability of the main body 3 is limited between an upright backrest position which is illustrated in FIG. 1 and a lowered functional position which is illustrated in FIGS. 3 to 6. In the lowered functional position the main body 3 of the centre backrest assembly bears on a seat face of the centre seat assembly or is arrested just thereabove in the functional position by way of a corresponding end stop in the pivoting mounting which is disposed on the frame structure 4. In the upright backrest position, the main body 3 retracts in a largely flush manner into the tray-like frame structure 4 which is designed so as to be dimensionally stable.

As can be seen by means of FIGS. 1 to 6, the main body 3 comprises a head region 5 which in the upright backrest position according to FIG. 1 is positioned so as to be approximately level with headrest assemblies (not illustrated) of the laterally adjacent seat assemblies. The head region 5, on its opposite sides which in the transverse direction to the vehicle in each case face outward, comprises in each case one lateral part 6 which in the region of its lateral face is provided with upholstery which is not referred to in more detail. Each lateral part 6, in the head region 5 of the main body 3, is mounted so as to be displaceable in the transverse direction to the vehicle between a bearing position which is illustrated in FIGS. 1 and 3 to 5, and a deployment position which is illustrated in FIGS. 2 and 6. Linear displaceability of the respective lateral part 6 is ensured in each case by one guide body 7 which is telescopically displaceable in a corresponding hollow-profile guide of the head region 5 and is fixedly connected to the lateral part 6. The fixed connection between the lateral part 6 and the assigned guide body 7 may be established by a unipartite design or by separately manufacturing the two components and subsequently interconnecting them in a materially integral, force-fitting or form-fitting manner. The two guide bodies 7 are mounted in the head region 5 of the main body 3 so as to be telescopically displaceable in a manner independent of one another. In order for the respective lateral part 6 to be displaced between the bearing position and the deployment position, a drive unit in the form of an electric motor $M_4$ is provided (FIGS. 7 and 8). According to the schematic illustration in FIGS. 7 and 8, only one single drive unit $M_4$ which is assigned to the two lateral parts 6 is provided. By way thereof, the two lateral parts 6 are synchronously deployed or retracted in a mutually opposing manner. In one exemplary embodiment (not illustrated) of the invention, in each case one dedicated drive unit is assigned to each lateral part 6, so as to be able to deploy or retract only one lateral part, if and when required.

As can be seen from FIG. 6, each guide body 7 is additionally provided with a container receptacle 16 which is designed as a drink holder. The container receptacle 16 is disposed in the guide body 7 in such a manner that the respective container receptacle 16 is open toward the top, once the main body 3 has reached its lowered functional position and the respective lateral part 6 has been deployed to its deployment position.

The movable lateral parts 6 with the assigned guide bodies 7 form functional portions in the context of the invention.

The main body 3 of the centre backrest assembly comprises further functional portions which will be described hereunder. In the region of an upper side—with respect to the lowered functional position of the main body 3—the main body 3 is assigned a height-displaceable upholstered cushion 9 which in the region of its surface is complementarily provided with a planar heating element 10 in order to obtain the effect of a heated armrest. On account of height displaceability the armrest may be individually adapted to the size of the person using the armrest. The armrest is formed by the upholstered cushion 9. The upholstered cushion 9 with respect to its surface upholstering is adjustable for both contouring as well as firmness. To this end, the upholstered cushion 9 comprises an air-cushion assembly of a plurality of air-cushioned portions which are pneumatically impingeable by means of a vacuum-pump installation V (FIG. 8).

Moreover, the armrest formed by the upholstered cushion 9 is implemented as a pivotable cover for a storage space 13 (FIG. 5). Two audio-system components 14 which may be implemented as loudspeakers are provided behind the storage space 13. The audio-system components 14 also form functional portions of the invention.

A front pivoting part 8 which forms a pivoting mounting for a tablet computer 15 is provided as a further functional portion in the region of the upper side of the main body 3. The tablet computer 15 is releasably held in the region of the lower side of the pivoting part 8 and is convertible to an operating position, once the pivoting part 8, in the lowered functional position of the main body 3, has been pivoted in a forward and upward manner according to FIG. 5. The pivoting part 8 is mounted on the main body 3 so as to be pivotably movable. Pivotability is limited by end stops, such that the operating position which is illustrated in FIG. 6 forms an outwardly pivoted end position of the pivoting part 8 and the inwardly pivoted position which is identifiable by means of FIGS. 3 to 5 forms the resting position of the pivoting part 8.

By means of a pivot drive which comprises an electric motor $M_1$ (FIG. 7), the main body 3 is pivoted between the upright backrest position and the lowered functional position. The pivot drive is controllable in such a manner that the main body 3, additionally to the mentioned end positions, is also arrestable in an intermediate position according to FIG. 2, which is referred to as the sleeping position. In relation to the upright backrest position, the main body 3 here is pivoted forward so far that the lateral parts 6 are moved out from their position which is partially retracted into the frame structure 4. On account thereof, the lateral parts 6 may be converted freely to their deployment position according to FIG. 2, without being hampered by the frame structure 4. Moreover, the sleeping position in terms of ergonomics has been selected such that a person who is located on the adjacent seat assembly 2 may comfortably bear their head on the respectively deployed lateral part 6, in order to assume a sleeping or resting position. The upholstery of the respective lateral part 6 increases the bearing and support comfort for the head of the respective person.

Moreover, a drive unit for displacing the height of the upholstered cushion 9 forming the armrest, which drive unit comprises an electric motor $M_3$, is integrated in the main body 3. A further electric motor $M_2$ serves as the drive unit for the vacuum-pump installation V, in that the electric motor $M_2$ drives a respective vacuum pump P. The vacuum-pump installation V serves to fill or empty the air-cushioned portions of the upholstered cushion, as has already been described above. The planar heating element 10 which is disposed below an upholstered cover of the upholstered cushion 9 is actuated by means of a temperature-control installation 25 (FIG. 8).

As has already been explained, the electric motor $M_4$ serves to displace the lateral parts 6 and their assigned guide bodies 7. Power supply to the various electric motors $M_1$ to $M_4$ and to the planar heating element 10 is performed via a vehicle on-board network 20 which is assigned an emergency switch 21.

In order for the drive units for the various functional portions to be actuated, a control device which comprises a plurality of control units $MC_1$ to $MC_4$ for controlling the electric motors $M_1$ to $M_4$ is provided. The control device comprises a plurality of sensor assemblies 11 and 12 which are implemented for identifying the gestures of an operator. The one sensor assembly 12 is formed by an acquisition panel which is effective by way of capacitance and which according to FIG. 1 is disposed in the region of a front side of the main body 3 below an upholstered cover. On account of corresponding gestures of a hand or of fingers, sensor signals which lead to desired controlling actions of the control units $MC_1$ to $MC_4$ are generated by way of the sensor assembly 12. Moreover, the pivoting part 8, in the region of its upper side—with respect to its resting position—has an operating panel 11 in the form of a touch panel which comprises a display which is accessible from above. On account of correspondingly integrated sensor technology, the operating panel 11 is sensitive to touch, such that finger movements on the operating panel 11 lead to correspondingly desired controlling actions for the mentioned control unit or for the temperature-control installation 25. A capacitive controlling component 23 is integrated in the sensor assembly 12. Moreover, a switch $S_2$ which identifies the closed resting position of the pivoting part 8 and switches off the operating panel 11 is provided. Moreover, the switch $S_2$ may also serve to convert the tablet computer 15 to the standby state.

The drive unit $M_4$ which serves for retracting and deploying the lateral parts 6 is assigned end switches 17 which define the bearing position and the deployment position of the respective lateral part 6 and correspondingly switch off the electric motor $M_4$. Moreover, the control units $MC_3$ and $MC_1$ are assigned potentiometers 18, 19, of which the potentiometer 18 is implemented as a linear potentiometer and the potentiometer 19 is implemented as a rotary potentiometer.

An electric or electronic plug-in connection $S_1$ forms the releasable control connector and power-supply connector for the tablet computer. The tablet computer may be provided with software in the form of an app which is suitable for controlling the drive units of the various functional portions of the main body 3. Additionally, the tablet computer may be provided for actuating further vehicle functional units, such as climate control of the vehicle interior, operation of audio- and video-system components of the electronic entertainment system, of the vehicle navigation system or of other regions of vehicle control and similar.

The invention claimed is:

1. A center backrest assembly for a vehicle interior, said assembly comprising a main body mounted in the vehicle interior for pivoting movement into a first position in which said main body is oriented substantially vertically and into a second position in which said main body is oriented substantially horizontally, said main body having a support region oriented at a top of said main body when said main body is in the first position, said assembly further including a lateral support part mounted on said support region at a lateral face thereof for movement relative to said lateral face into a non-deployed position in which said lateral support part is disposed closely adjacent said lateral face and into a deployed position in which said lateral support part is spaced outwardly from said lateral face, said lateral support part being movable into the deployed position when said main body is in the first position.

2. The assembly according to claim 1, wherein said main body is movable into a third position in which said main body is displaced from the first position by a predetermined pivot angle in a direction away from the second position, said main body in the third position being oriented substantially vertically, and said lateral support part is freely movable into the deployed position when said main body is in the first position such that said lateral support part forms a head rest for a vehicle passenger, said main body being fixable in the first position and when in the first position defining an upright sleeping position.

3. The assembly according to claim 1, wherein said lateral support part is a first lateral support part and said lateral face is a first lateral face, said assembly includes a second lateral support part mounted on said support region at a second lateral face thereof for movement relative to said second lateral face between a non-deployed position in which said second lateral support part is disposed closely adjacent said second lateral face and a deployed position in which said second lateral support part is spaced outwardly from said second lateral face, said first and second lateral support parts being movable relative to said support region in opposite directions relative to one another.

4. The assembly according to claim 3, wherein said first and second lateral support parts are mounted on said support region in a linearly movable manner.

5. The assembly according to claim 1, wherein said main body has a longitudinally elongated shape and is mounted for pivoting movement into the first and second positions about a pivot axis oriented transversely to a longitudinal dimension of said main body, and said lateral support part is movable into the non-deployed and deployed positions in a direction transverse to the longitudinal dimension and substantially parallel to the pivot axis.

6. The assembly according to claim 1, wherein said lateral support part is mounted on said support region by a guide body, said support region being oriented at a front end of said main body when said main body is in the second position, said guide body defining therein a container receptacle disposed between said lateral support part and said support region when said lateral support part is the deployed position, said container receptacle opening upwardly when said main body is in the second position.

7. The assembly according to claim 1, wherein said main body includes first and second oppositely facing sides oriented transversely to said lateral face of said support region, said first side defining an upwardly facing side of said main body which is oriented substantially horizontally and accessible when said main body is in the second position, and said second side defines a forwardly facing side of said main body which is oriented substantially vertically and accessible when said main body is in the first position, said first side or said second side including an upholstered cushion having a variable firmness or a variable contour.

8. The assembly according to claim 1, wherein said main body includes a height-adjustable cushion disposed at a position suitable for use as an armrest when said main body is in the second position.

9. The assembly according to claim 1, further including a frame structure, said main body being mounted in a lower end region of said frame structure for pivoting movement relative to said frame structure into the first and second positions, said frame structure being configured for fixed mounting in a vehicle.

10. The assembly according to claim 1, wherein said main body has a longitudinally elongated shape and is mounted for pivoting movement into the first and second positions about a pivot axis oriented transversely to a longitudinal length dimension of said main body, said main body having a width dimension oriented transversely to the longitudinal length dimension, said main body having a first end disposed adjacent the pivot axis and a second free end spaced therefrom and defining said support region, said lateral support part when in the deployed position enlarging the width dimension of said main body solely at said second free end thereof.

11. A support assembly for mounting within a vehicle interior adjacent a seat arrangement thereof, said support assembly comprising:
an elongate main body mounted for pivoting movement about a pivot axis into a raised position in which said main body is oriented substantially vertically and into a lowered position in which said main body is oriented substantially horizontally, the pivot axis being oriented transversely to a longitudinal dimension of said main body, said main body having a first end disposed adjacent the pivot axis and a second free end longitudinally spaced therefrom; and
a support part mounted on said main body for movement in a direction substantially parallel to the pivot axis into a non-deployed position in which said support part is disposed adjacent a lateral face of said second free end and into a deployed position in which said support part is spaced outwardly from said lateral face of said second free end, said support part being movable into the deployed position when said main body is in the raised position such that said support part forms a head rest for a vehicle passenger.

12. The support assembly according to claim 11, wherein said support part is a first support part and said lateral face is a first lateral face, said support assembly includes a second support part mounted on said main body for movement in a direction substantially parallel to the pivot axis into a non-deployed position in which said second support part is disposed adjacent a second lateral face of said second free end and into a deployed position in which said second support part is spaced outwardly from said second lateral face of said second free end, said first and second lateral faces facing away from one another on respective opposite sides of said second free end, and said first and second support parts being movable into their respective deployed positions when said main body is in the raised position such that said first and second support parts form respective head rests for vehicle passengers positioned on respective opposite sides of said support assembly.

13. The support assembly according to claim 11, wherein said second free end and said support part are located at a topmost portion of said main body when said main body is disposed in the raised position such that said support part forms a head rest for a passenger.

14. The support assembly according to claim 13, wherein said second free end and said support part are located at a frontmost portion of said main body when said main body is disposed in the lowered position such that said support part forms a knee rest for a passenger.

15. The support assembly according to claim 12, wherein said main body includes oppositely-facing first and second sides, said first side being oriented substantially horizontally and facing upwardly when said main body is in the lowered position, said main body including a cushion disposed at said first side and defining an armrest for a vehicle passenger when said main body is in the lowered position.

16. The support assembly according to claim 11, wherein said support part is mounted on said second free end by a guide body, said guide body defining therein a container receptacle which opens upwardly when said main body is in the lowered position and said guide body is disposed between said lateral face and said support part when said support part is in the deployed position.

17. A center backrest assembly for a vehicle interior, the backrest assembly including a main body mounted in the vehicle interior so as to be pivotable between an upright backrest position and a lowered functional position, the main body comprising a head region, the head region in the upright backrest position of the main body being positioned at a top of the main body, the head region on at least one lateral face thereof having a lateral part mounted on the main body so as to be movable between a bearing position in which the lateral part bears on the head region and a laterally deployed deployment position, the backrest assembly further including a drive unit for displacing the lateral part between the bearing position and the deployment position, and a control device which activates or deactivates the drive unit based on a position of the main body.

* * * * *